(12) United States Patent
Lüchinger

(10) Patent No.: US 6,835,901 B2
(45) Date of Patent: Dec. 28, 2004

(54) BALANCE WITH A WEIGHING-LOAD CARRIER

(75) Inventor: Paul Lüchinger, Uster (CH)

(73) Assignee: Mettler-Toledo GmbH, Greifensee (CH)

(*) Notice: Subject to any disclaimer, the term of this patent is extended or adjusted under 35 U.S.C. 154(b) by 0 days.

(21) Appl. No.: 10/355,935

(22) Filed: Jan. 31, 2003

(65) Prior Publication Data

US 2003/0115929 A1 Jun. 26, 2003

Related U.S. Application Data

(62) Division of application No. 09/957,977, filed on Sep. 21, 2001, now Pat. No. 6,557,391.

(30) Foreign Application Priority Data

Oct. 4, 2000 (CH) ................................................ 1957/00

(51) Int. Cl.[7] .......................... G01G 21/22; G01G 21/28
(52) U.S. Cl. ......................... 177/253; 177/238; 177/262
(58) Field of Search ................................. 177/126–128, 177/180–182, 238–244, 246, 253, 260, 262–263, 50; 73/1.13

(56) References Cited

U.S. PATENT DOCUMENTS

| 4,510,807 A | * | 4/1985 | Tokutake et al. | ......... 177/50 X |
| 4,766,965 A | * | 8/1988 | Luchinger | ..................... 177/50 |
| 4,789,033 A | * | 12/1988 | Dohrmann | .............. 177/244 X |
| 4,887,678 A | * | 12/1989 | Largenton | ............... 177/263 X |
| 6,420,666 B1 | * | 7/2002 | Baumeler et al. | ....... 177/262 X |
| 6,603,081 B2 | * | 8/2003 | Luchinger | ............... 177/262 X |
| 2003/0188897 A1 | * | 10/2003 | Ludi et al. | ................... 177/145 |

* cited by examiner

Primary Examiner—Thomas P. Noland
(74) Attorney, Agent, or Firm—Friedrich Kueffner

(57) ABSTRACT

A balance includes a weighing compartment and a balance housing containing a weighing cell, wherein the balance housing forms a rear wall and a floor of the weighing compartment. A weighing-load carrier is coupled to a coupling arrangement extending through passage openings formed at the rear wall. The weighing-load carrier that is configured as a level grate. The floor extends without openings below the weighing-load carrier.

11 Claims, 5 Drawing Sheets

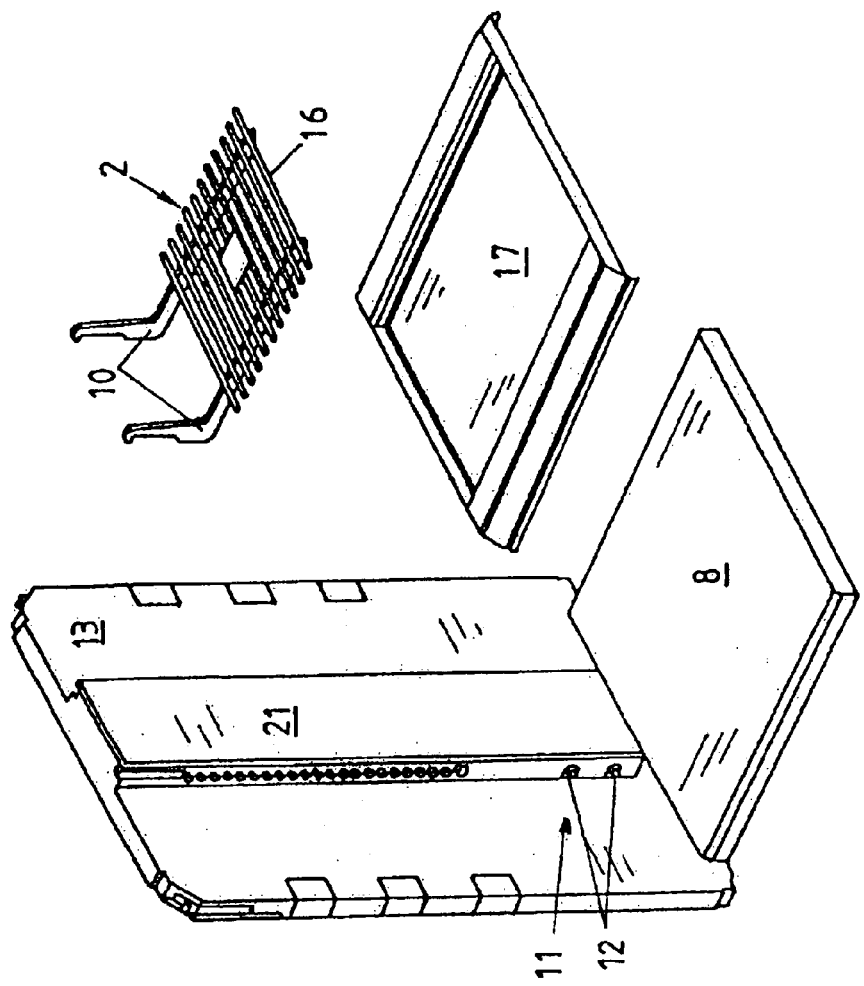
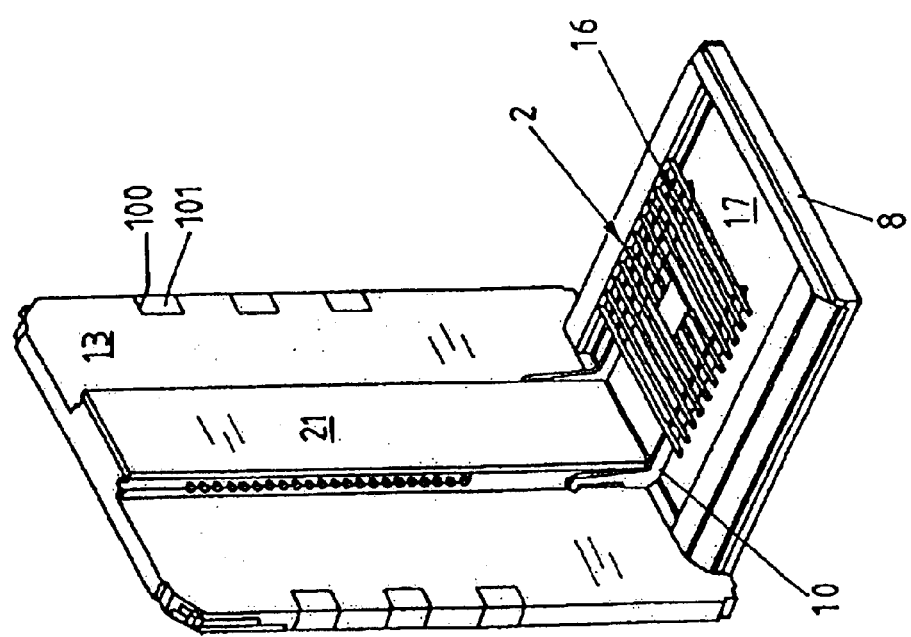

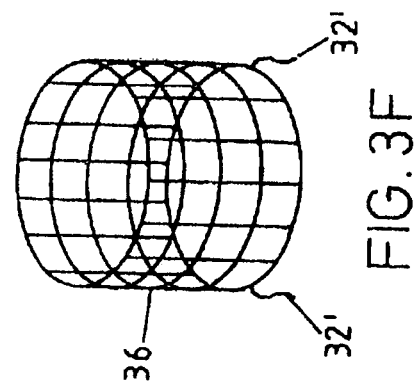
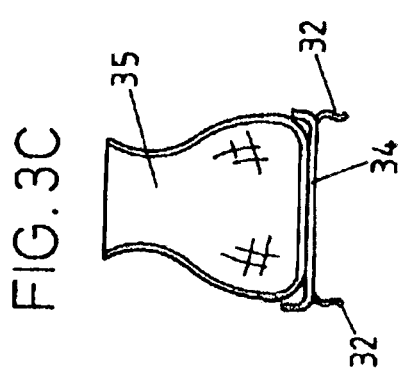
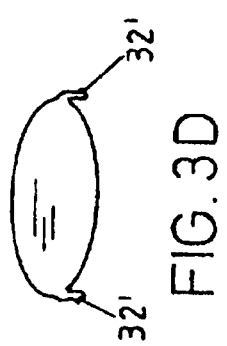
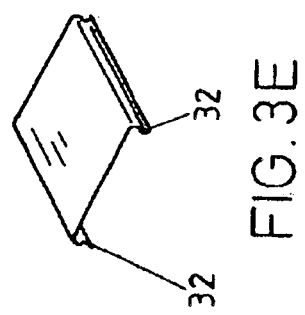
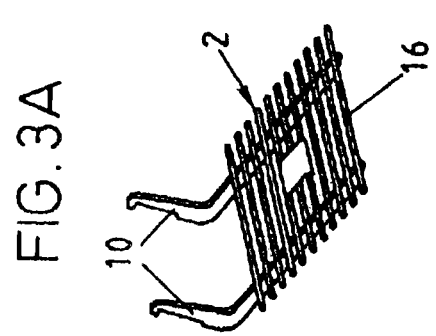
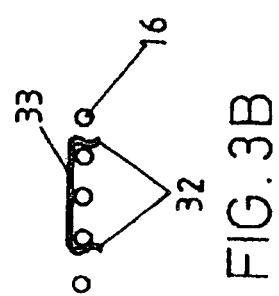

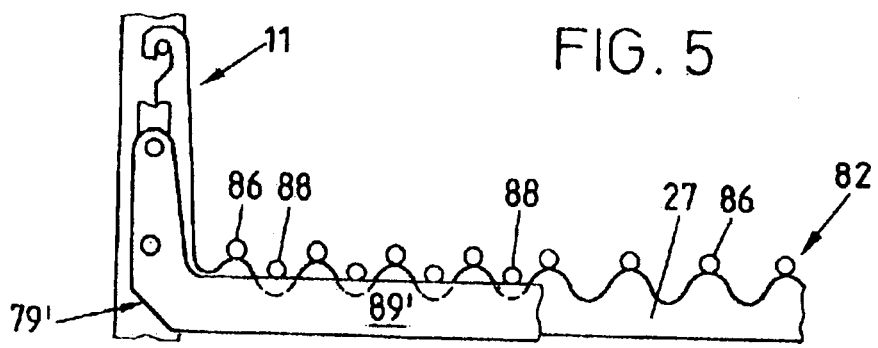
FIG. 5
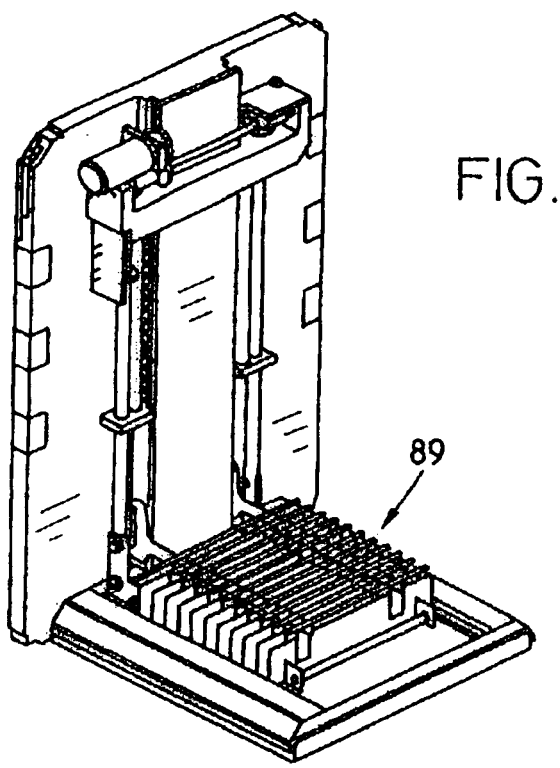
FIG. 6A
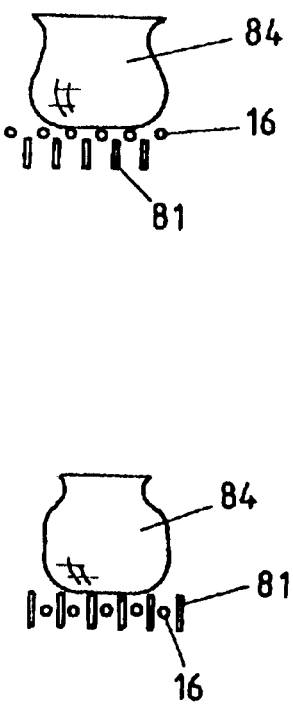
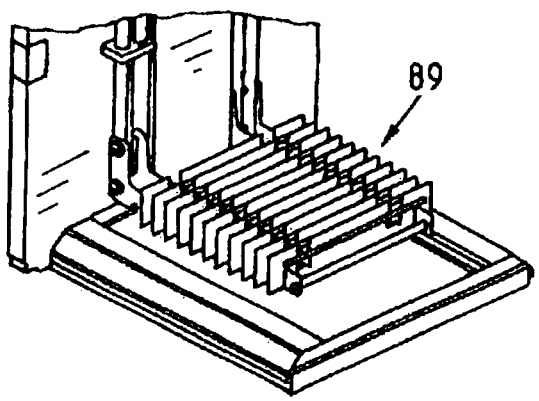
FIG. 6B

BALANCE WITH A WEIGHING-LOAD CARRIER

CROSS-REFERENCE TO RELATED APPLICATIONS

This application is a divisional application of U.S. application Ser. No. 09/957,977, filed Sep. 21, 2001, and now U.S. Pat. No. 6,557,391.

BACKGROUND OF THE INVENTION

The present invention relates to a balance with a balance housing containing a weighing cell and with a carrier for the weighing load.

Balances of this type serve mainly as analytical balances and are used widely in laboratories.

A balance meeting the foregoing description is disclosed in U.S. Pat. No. 4,766,965. The weighing pan is supported by a cantilever arm that is attached to and projects forward from the bottom end of the load receiver of the weighing cell. The weighing pan is arranged immediately above the floor of the weighing compartment and is connected to the cantilever arm through an opening in the floor. A calibration device with a mechanism for raising and lowering the reference weights is arranged below the floor of the weighing compartment.

A further balance in the same general category is described in JP 62-266421, disclosing a concept where the weighing pan as well as a cantilever arm supporting the weighing pan are arranged above the floor of the weighing compartment. The support arm for the weighing pan is connected to the inner working mechanism of the balance through a passage opening in the rear wall of the weighing compartment.

OBJECT OF THE INVENTION

The object of the present invention is to propose a balance that has a compact design, does not easily become contaminated and can be used in a multitude of applications.

SUMMARY OF THE INVENTION

A balance according to the present invention has a balance housing containing a weighing cell. The weighing-load carrier of the balance is configured as a plane horizontal grate (synonymously referred to as a level grate).

This has many possible applications for weighing in a laboratory. For example, receptacles or devices of the most diverse kinds can be set on the grate and/or clamped to the grate. Spilled sample material does not stay on the weighing-load carrier but drops off between the bars of the grate, so that the spilled material cannot inadvertently be included in a weighing.

It is advantageous to arrange a fixed or removable spill-collector pan on the floor of the weighing compartment to catch spilled weighing sample material. This greatly facilitates cleaning of the weighing compartment.

In a particularly favorable design, the bars of the grate have a roof-like triangular profile with a ridge at the top, which further reduces the risk that spilled sample material could falsify the weight measurements. Using a grate as weighing-load receiver has also particular advantages for fastening different kinds of holders for sample containers.

In a preferred embodiment of the invention, a load-relief mechanism is arranged at the rear wall for raising and lowering the load on the weighing-load carrier. The load-relief mechanism has a lift platform shaped like a grid of bars or spaced-apart lamellae. When the lift platform is raised, the bars or lamellae of the lift platform come up through the gaps between the bars of the carrier grate for the weighing load and lift the weighing object off the carrier grate. This process serves to automate the tare function. With the load-relief mechanism, it is not necessary to remove and subsequently return the weighing load when re-zeroing the balance. Thus, a potential source of weighing errors is avoided. It is also possible to perform long-term weight studies and recalibrate the balance between the individual weighings.

To facilitate cleaning of the balance, the lift platform is designed to be easily disassembled. Preferably, the load-relief mechanism is motorized.

Advantageous traits of a balance according to the invention are its compact design and its modular configuration that make it remarkably versatile for a variety of laboratory applications. The inventive balance is distinguished by its flexibility and by how quickly it can be reconfigured for different applications. In addition, cleaning the separate components is very easy.

BRIEF DESCRIPTION OF THE DRAWINGS

Further details of the invention may be learned from the following description of embodiments that are schematically illustrated in the drawings, wherein

FIGS. 2A and 2B represent a perspective, three-dimensional view of the weighing compartment without the balance housing and draft shield enclosure;

FIGS. 3A to 3F represent clip-on devices for different applications that can be attached to the grate of the weighing-load carrier;

FIG. 5 represents a side view of a grid-shaped lift platform together with the weighing-load carrier;

FIGS. 6A and 6B illustrate in a three-dimensional view how the load-relief mechanism works.

DETAILED DESCRIPTION OF PREFERRED EMBODIMENTS

Figure 1:
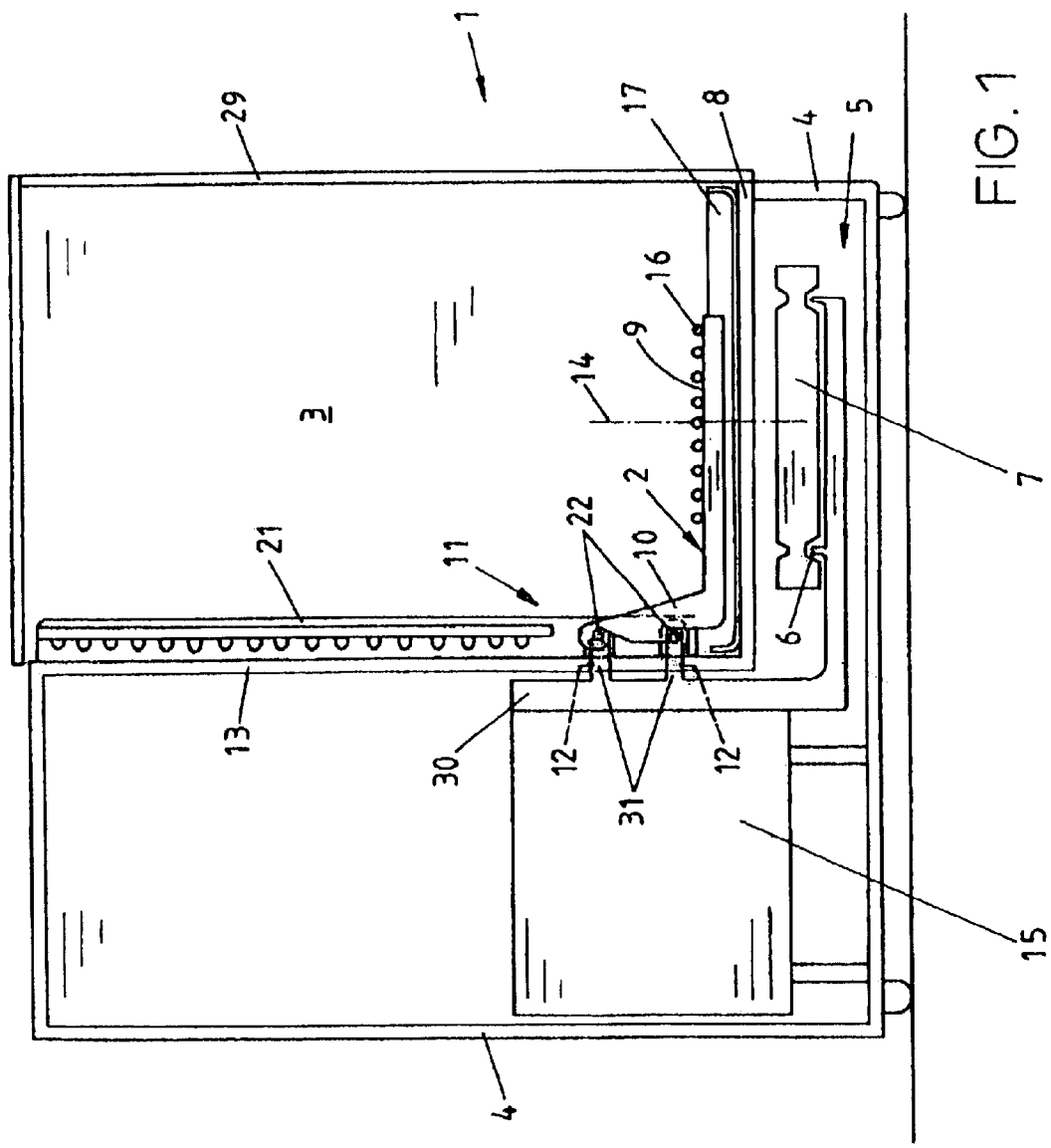
FIG. 1 represents a side view of the balance.

FIG. 1 shows a side view of the balance 1 with a balance housing 4 and a draft shield 29 enclosing the weighing compartment 3. The left-hand portion of the balance housing 4 contains the weighing cell 15, which is not illustrated in detail. An L-shaped cantilever 30 with a calibration device 5 is connected to the load-receiving portion of the weighing cell 15 to introduce the weight force into the weighing cell. The lower portion of the L-shaped cantilever 30 has a weight-receiving element 6 for the calibration weights 7. The calibration device 5 is arranged in a portion of the balance housing 4 that is closed off by the floor 8 against the weighing compartment 3. The vertical portion of the L-shaped cantilever 30 has projections 31 extending towards the weighing compartment 3 and standing out through the passage openings 12 of the rear wall 13 of the weighing compartment 3. The projections 31 with laterally protruding coupler bolts 22 form a coupling arrangement 11 for the hook-up portions 10 of the weighing-load carrier 2. The weighing-load carrier 2 serves as a platform for a variety of clip-on devices used in different applications, for example bowls, laboratory vessels, other containers for weighing samples, or for the weighing samples themselves. In the example of FIG. 1, the weighing-load carrier 2 is configured as a level grate 16. A grate also reduces the potential for weighing errors due to air drafts, because the grate offers a smaller effective surface to air currents than a weighing platform with a solid surface.

The weighing-load carrier 2 has a center point where the weighing object should be placed. The mass center of gravity of the calibration weights 7 is preferably located on the vertical axis 14 that extends through this center point when there is a load on the weighing-load carrier (in this case, the center point coincides with the center of gravity of the carrier surface area 9). Given that the balance 1 does not require an opening in the floor 8 for movable parts of the balance mechanism, a spill-collector pan 17 is arranged to completely cover the floor 8 below the weighing-load carrier 2. Spilled sample material will thus drop into the spill-collector pan 17, so that it cannot inadvertently be included in a weighing. This concept works most effectively if the bars of the grate are of a roof-like triangular profile with a ridge at the top. In addition, the arrangement of the foregoing description is easy to clean.

A holder system 21 is provided at the rear wall 13 above the place where the hook-on portions 10 of the weighing-load carrier 2 are hooked onto the bolts 22 on the projections 31. The holder system 21 offers a variety of user conveniences and applications related to the weighing process.

FIG. 2A gives a perspective view into the weighing compartment 3 without the draft shield 29. The only parts of the balance housing 4 that are shown are the rear wall 13 of the weighing compartment 4 and the parts that make up the floor 8 of the weighing compartment. The weighing-load carrier 2 is shown in the installed condition in FIG. 2A, and the spill-collector pan 17 is in place. FIG. 2B gives an analogous view with the weighing-load carrier 2 detached and the spill-collector pan taken out.

FIGS. 3A to 3F illustrate a variety of clip-on attachments for different applications, which can be used together with the grate 16 of the weighing-load carrier 2. FIG. 3A shows the weighing-load carrier 2 in the form of a grate 16. FIG. 3B shows a sample-carrier plate 33 with clip-on border portions 32 as a possible means of attachment. Also conceivable are dish-shaped attachments 34 for laboratory vessels 35 as shown in FIG. 3C, or round attachments as shown in FIG. 3D, or rectangular sample-carrier plates as shown in FIG. 3E. The wire-mesh ring 36 of FIG. 3F serves as a Faraday cage to counteract the build-up of electrostatic charges. A preferred form of attachment is by means of clip-on borders 32, as described above, or by means of clip-on ears 32'.

With the balance 1 according to the invention, a multitude of advantageous arrangements are possible in the weighing compartment 3, due to a holder system 21 on the rear wall 13 of the weighing compartment which allows accessory devices to be set up for example on shelves and holders that can be mounted at different heights from the floor 8.

Figure 4:
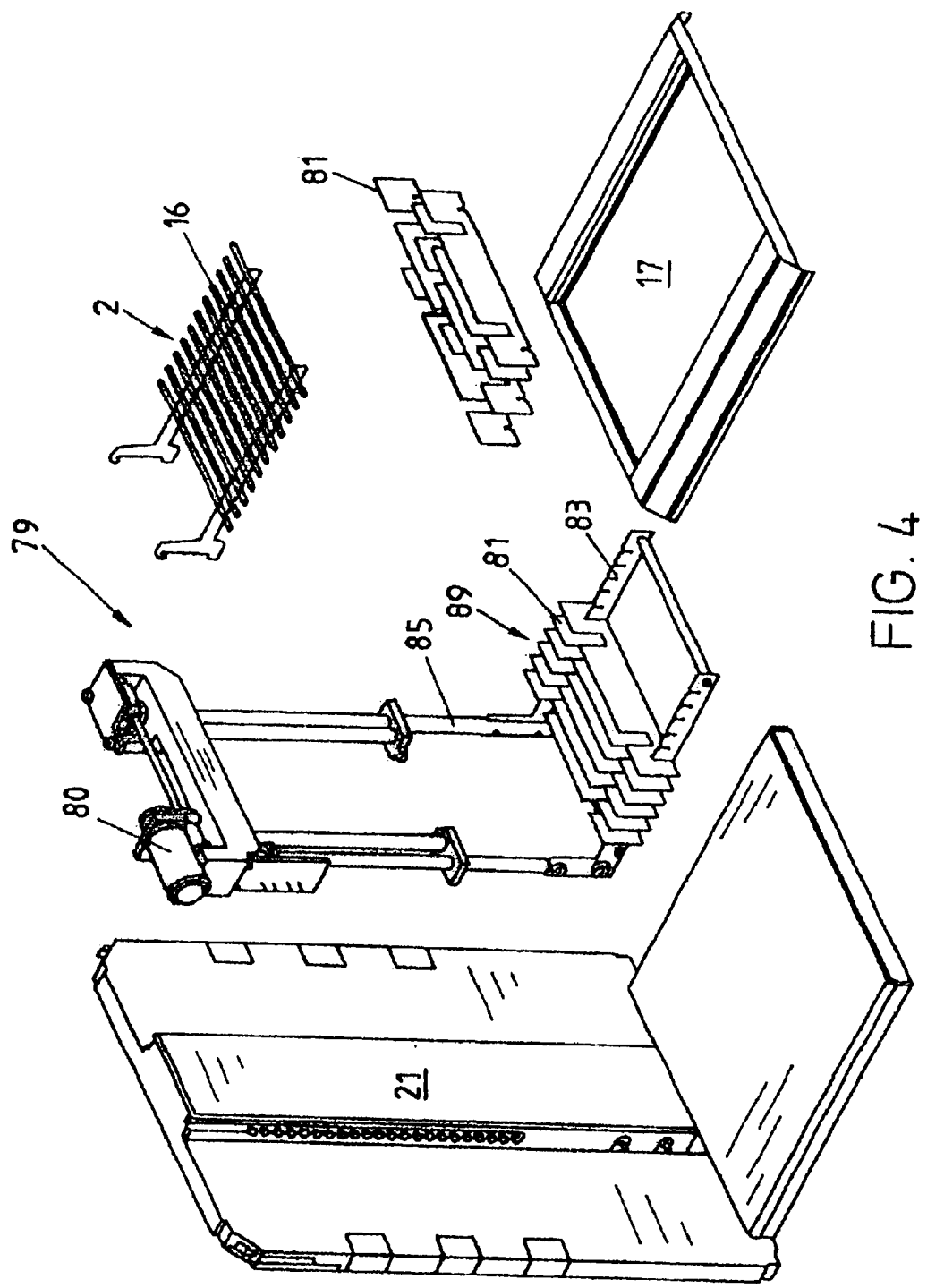
FIG. 4 represents a load-relief mechanism in a three-dimensional view.

FIG. 4 gives a perspective view of a load-relief mechanism 79 that can be attached to the holder system 21. The mechanism has an L-shaped frame 85 and a motor 80 for raising and lowering a lift platform 89 with arms 83 and a grid of spaced-apart lamellar elements 81. When the lift platform is raised, the lamellar elements 81 come up through the gaps between the bars of the grate 16 of the weighing-load carrier 2.

FIG. 5 represents a side view of a detail portion of a differently designed load-relief system 79' in the area of the weighing-load carrier 82 and the lift platform 89'. The weighing-load carrier 82, which is connected to the coupling arrangement 11, has a modified design of the grate in the shape of a rake, where the two lateral support beams 27 of the grate have wave-shaped contours with the bars 86 of the grate attached to the tops of the waves. The bars 88 of the load-relief system 79' are arranged so that they lie between and normally below the bars 86, extending through the valleys of the wave contours. When the load-relief system 79' is raised, the bars 88 of the lift platform 89' will come up through the gaps between the bars 86 of the weighing-load carrier 82 into a position above the plane of the bars 86.

An example of how the load-relief system 79 works is illustrated in FIGS. 6A and 6B with the lamellar arrangement of the lift platform. FIG. 6A shows the load-relief system in the weighing position, where the weighing container 84 is supported by the grate 16 of the weighing-load carrier 2. The lamellae 81 of the lift platform grid are in the down position. In contrast, FIG. 6B shows the rest position where the weighing container 84 rests on the raised lamellae 81 of the lift platform 89. In this condition, the load is taken off the grate 16 of the weighing-load carrier 2. The lamellar arrangement of the lift platform as well as the grate 16 of the weighing-load carrier 2 are easy to clean. A useful application of the load-relief system is in long-term weight studies where it is necessary to re-zero the balance at prescribed time intervals, in this case without the weighing container. It is also conceivable to recalibrate the balance, e.g. during a long-term application. In a calibration cycle, the weighing container 84 with the weighing sample is lifted off the grate 16 of the weighing-load carrier 2, 82 by means of the load-relief system 79, 79'. Then the calibration weight 7 is placed on the weight-receiving element 6 of the calibration device 5 and weighed. After the new calibration data for the balance 1 have been calculated and stored in memory, the weighing container 84 with the weighing sample is set back onto the weighing load carrier 2, 82 by lowering the load-relief device 79, 79', at which point the normal weighing operation of the balance can be resumed.

The load-relief system is further useful, when multiple weighings of the same weighing sample have to be made for statistical purposes, e.g., to determine a standard deviation. The load-relief system makes it unnecessary for the operator to manually put the weighing sample on and off the balance.

For experimental setups of all kinds that are installed in the weighing compartment, cables and hoses can be passed from the outside into the weighing compartment through openings 100 that can be closed with clip-on covers 101 as shown in FIG. 2. Details are described in the parallel European patent application EP-A-1 195 585.

What is claimed is:

1. A balance (1) with a weighing compartment (3) and with a balance housing (4) containing a weighing cell (15), the balance housing (4) forming a rear wall (13) and a floor (8) of the weighing compartment (3); the balance comprising a weighing-load carrier (2) that is coupled to a coupling arrangement (11) extending through passage openings (12) formed at the rear wall; wherein the weighing-load carrier (2) is configured as a level grate, and wherein the floor (8) extends without openings below the weighing-load carrier (2).

2. The balance of claim 1, further comprising a spill-collector pan (17) arranged below the weighing-load carrier (2).

3. The balance of claim 2, wherein the spill-collector pan (17) is permanently installed in the balance.

4. The balance of claim 2, wherein the spill-collector pan (17) is removable from the balance.

5. The balance of claim 1, wherein the grate (16) has bars of a roof-like triangular profile with a ridge on top.

6. The balance of claim 1, wherein the balance has attachments (33, 34) configured to hold weighing containers and wherein said attachments are adapted to be fastened to the grate (16).

7. The balance of claim 1, further comprising a load-relief, system (79, 79') cooperating with the weighing-load carrier (2).

8. The balance of claim 7, wherein the load-relief system (79) comprises a grid-shaped lift platform (89) with lamellar grid members (81), the weighing-load carrier (2) comprises a level grate (16), and the lamellar grid members (81) are arranged so that they reach through the grate (16) in such a manner that when the lift platform (89) is raised, a weighing object sitting on the weighing-load carrier (2) is lifted off the weighing-load carrier by the lamellar grid members (81).

9. The balance of claim 7, wherein the weighing-load carrier (82) and the lift platform (89') both comprise level grates with bars and wherein the grate bars of the lift-platform (89') are arranged to pass between the grate bars of the weighing-load carrier (82) in such a manner that when the lift platform (89') is raised, a weighing object sitting on the weighing-load carrier (82) is lifted off the weighing-load carrier by means of the lift platform (89').

10. The balance of claim 7, further comprising a motor (80) to drive the load-relief system (79, 79').

11. The balance of claim 7, wherein the load-relief system (79, 79') is configured to be attached to the rear wall.

\* \* \* \* \*